(12) United States Patent
Renschler

(10) Patent No.: US 7,738,448 B2
(45) Date of Patent: Jun. 15, 2010

(54) METHOD FOR GENERATING AND SENDING SIGNALING MESSAGES

(75) Inventor: Martin Hans Renschler, San Diego, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1203 days.

(21) Appl. No.: 11/321,611

(22) Filed: Dec. 29, 2005

(65) Prior Publication Data

US 2007/0153775 A1 Jul. 5, 2007

(51) Int. Cl.
*H04L 12/66* (2006.01)
(52) U.S. Cl. .............. 370/356; 370/277; 370/360; 370/516; 375/333; 375/359; 375/361; 707/10; 709/249; 717/136; 717/146
(58) Field of Classification Search ......... 370/351–356, 370/468, 477, 521, 282, 338, 401, 277, 360, 370/516; 379/900; 455/3.01–3.06, 414.1–414.4, 455/72, 41.2, 466, 518; 709/227, 230, 246–247, 709/217, 249; 375/333, 359, 361; 707/100, 707/10; 717/146, 136; 719/217
See application file for complete search history.

(56) References Cited

U.S. PATENT DOCUMENTS

| 4,112,383 | A | * | 9/1978 | Burgert ................. 375/333 |
| 5,465,268 | A | * | 11/1995 | Rainbolt ................. 375/333 |
| 5,696,800 | A | * | 12/1997 | Berger ................... 375/361 |
| 5,768,539 | A | * | 6/1998 | Metz et al. .............. 709/249 |
| 5,892,950 | A | * | 4/1999 | Rigori et al. ............ 717/146 |
| 6,370,212 | B1 | * | 4/2002 | Nakai .................... 375/359 |
| 6,377,575 | B1 | * | 4/2002 | Mullaney et al. ......... 370/360 |
| 6,597,752 | B1 | * | 7/2003 | Chen et al. .............. 375/361 |
| 6,631,144 | B1 | * | 10/2003 | Johansen ................. 370/516 |
| 7,412,541 | B1 | * | 8/2008 | Stadler et al. ............ 709/247 |
| 7,468,983 | B2 | * | 12/2008 | Requena et al. ........... 370/401 |
| 7,552,124 | B2 | * | 6/2009 | Drukin .................... 707/10 |
| 7,562,352 | B2 | * | 7/2009 | Yamada et al. ........... 717/136 |
| 7,607,171 | B1 | * | 10/2009 | Marsden et al. ........... 726/24 |

(Continued)

FOREIGN PATENT DOCUMENTS

EP 1376878 A 1/2004

(Continued)

OTHER PUBLICATIONS

Nordberg, M. et al, "Improving SigComp Performance Through Extended Operations." 58th IEEE Vehicular Technology Conference, Oct. 6-9, 2003, Orlando, FL, US, pp. 3425-3428.

(Continued)

*Primary Examiner*—Gerald Gauthier
(74) *Attorney, Agent, or Firm*—Coats & Bennett, P.L.L.C.

(57) ABSTRACT

A signaling method reduces bandwidth requirements and signaling delays normally associated with sending text-based signaling messages over a wireless links. An application at a transmitting endpoint generates and sends a binary-encoded signaling message, along with a binary interpreter that enables the receiving endpoint or SIP server to construct a text-based message from the binary encoded message. The binary-encoded signaling message may include references to a saved state, or to a dictionary to enable compression of the message. The signaling method can be used with any text-based signaling protocol, such as the Session Initiation Protocol, the Session Description Protocol, and the Real Time Streaming Protocol.

12 Claims, 6 Drawing Sheets

U.S. PATENT DOCUMENTS

| | | | |
|---|---|---|---|
| 7,630,330 B2* | 12/2009 | Gatts | 370/277 |
| 2003/0097421 A1* | 5/2003 | Wille et al. | 709/217 |
| 2003/0233478 A1 | 12/2003 | Chuah et al. | |
| 2005/0004920 A1* | 1/2005 | Omori | 707/100 |
| 2005/0185677 A1 | 8/2005 | Christoffersson et al. | |
| 2005/0243747 A1* | 11/2005 | Rudolph | 370/282 |
| 2005/0265367 A1* | 12/2005 | Teodosiu et al. | 370/401 |
| 2006/0048163 A1* | 3/2006 | Bessis | 719/313 |
| 2006/0117307 A1* | 6/2006 | Averbuch et al. | 717/143 |
| 2006/0183491 A1* | 8/2006 | Gundu et al. | 455/518 |
| 2006/0209775 A1* | 9/2006 | Lim et al. | 370/338 |
| 2007/0032194 A1* | 2/2007 | Griffin | 455/41.2 |
| 2008/0070601 A1* | 3/2008 | Brueckheimer et al. | 455/466 |
| 2008/0137645 A1* | 6/2008 | Skog | 370/352 |

FOREIGN PATENT DOCUMENTS

| | | |
|---|---|---|
| WO | 2005011175 A | 2/2005 |

OTHER PUBLICATIONS

Christoffersson J. et al, "Signaling Compression (SigComp)—Extended Operations." Networking Group Request for Comments, Jan. 2003, p. 1-17, vol. 3321.

* cited by examiner

METHOD FOR GENERATING AND SENDING SIGNALING MESSAGES

BACKGROUND OF THE INVENTION

The present invention relates generally to signaling protocols for wireless communication systems, and more particularly, to a method of reducing the size of signaling messages transmitted over a wireless communication link.

The Session Initiation Protocol (SIP) and the Session Description Protocol (SDP) are becoming the de facto standards for IP telephony. SIP is a text-based protocol used for setting-up, modifying, and tearing down media sessions. SIP has also been extended for instant messaging and presence services. SDP is a text-based signaling protocol for describing multimedia sessions. SDP is used for purposes such as session announcement, session invitation, and other forms of multimedia session initiation.

SIP and SDP were originally designed for rich bandwidth connections, so message sizes are not optimized and tend to be rather large. The relatively large message size of SIP messages causes some difficulties when SIP signaling must traverse a narrow bandwidth connection, such as a radio interface in wireless networks or a low-speed serial connection. The large message size of SIP messages consumes valuable bandwidth in wireless networks and substantially increases call set-up time.

The Internet Engineering Task Force (IETF) has developed a signal compression protocol known as SIGCOMP to reduce the size of SIP messages for transmission over limited bandwidth connections. The SIGCOMP protocol is described in IETF documents RFC 3320 and RFC 3321, which are incorporated herein by reference. The SIGCOMP protocol makes use of compression/decompression engines at the sending and receiving nodes. The sending node compresses SIP messages and sends the compressed messages to the receiving node along with decompression code needed to decompress the message. Because decompression code is passed from the sender to the receiver, software SIP clients can implement virtually any known compression algorithm and remain compatible with other SIP clients.

SUMMARY OF THE INVENTION

The present invention provides a method for sending a text-based signaling message over the air interface of a wireless network. The present invention may be used, for example, to send SIP signaling messages. Conventionally, binary message data is converted into a text-based signaling message, which is then compressed to reduce the message size before transmitting it over the air interface. According to the present invention, the sending node sends the binary message data along with executable code for converting the binary message data into standard SIP signaling messages. The binary message data and the executable code may be transmitted together in a single message or may be transmitted separately. The executable code is used at a proxy server or at the receiving end point to generate standard SIP text. The binary message data may be compressed prior to transmission over the air interface using a saved state or dictionary. The compression algorithm may replace binary message data with a pointer or other reference to an item in a saved state or dictionary.

DETAILED DESCRIPTION OF THE INVENTION

Figure 1:
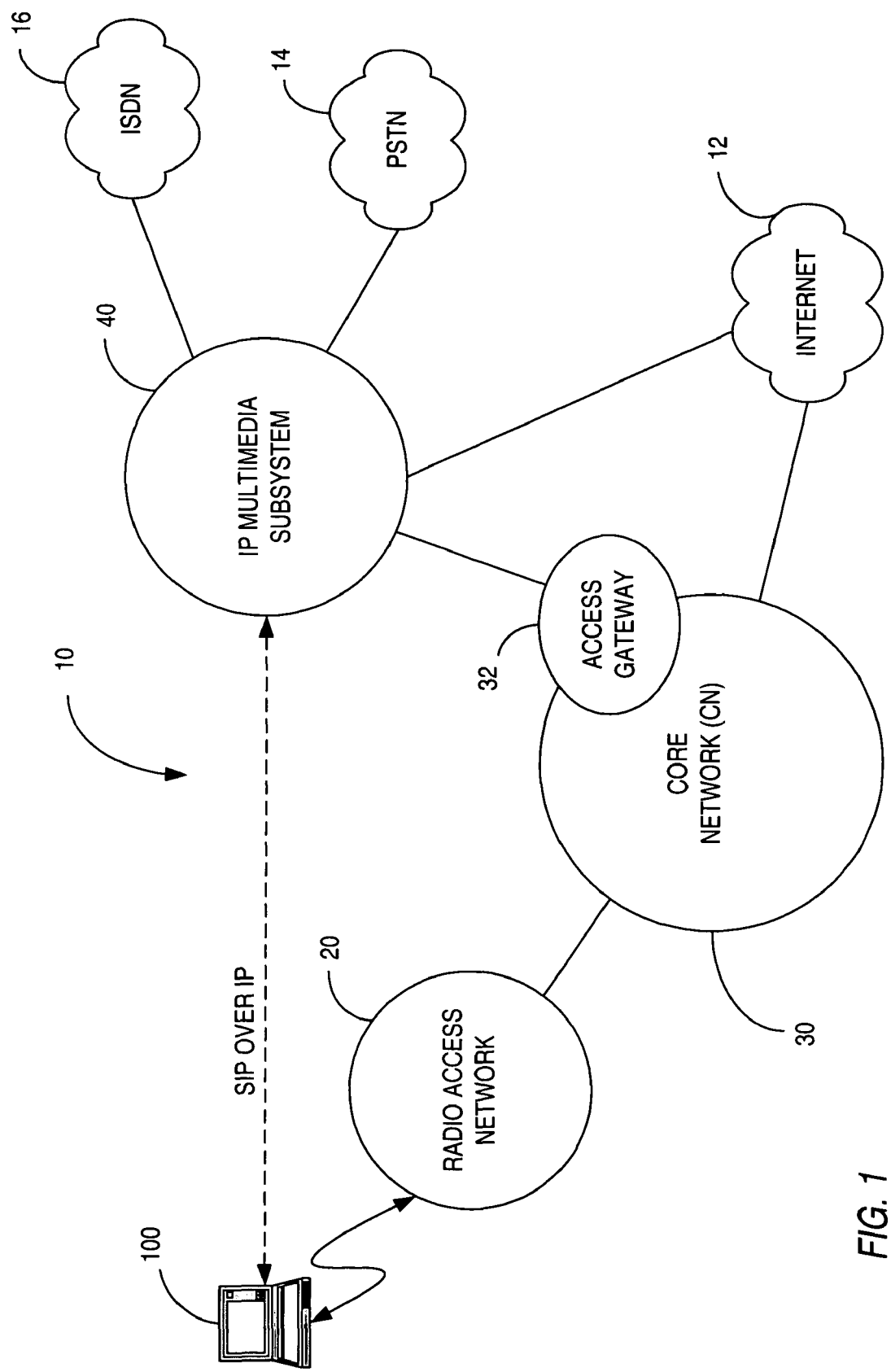
FIG. 1 is a functional block diagram of a wireless network using the signaling framework of the present invention.

FIG. 1 illustrates the main functional elements of a wireless network 10 that employs the signaling method of the present invention. The wireless network may, for example, comprise a GSM/GPRS network, cdma2000 network, or Wideband CDMA network. The wireless network comprises a radio access network (RAN) 20, a core network (CN) 30, and an IP Multimedia Subsystem (IMS) 40. The RAN 20 supports radio communications with mobile terminals 100 over an air interface. The wireless network 10 typically includes more than one RAN 20 though only one is shown in FIG. 1. The CN 30 provides a connection to the Internet 12 or other packet data network (PDN) for packet switched services, and may provide a connection to the Public Switched Telephone Network (PSTN) 14 and/or the Integrated Digital Services Network (ISDN) 16 for circuit-switched services, such as voice and fax services. The CN 30 includes an access gateway 32 for interconnecting with the IMS 40. The access gateway 32, such as a GPRS Gateway Serving Node (GGSN) for GPRS networks or a Packet Data Serving Node (PDSN) for cdma2000 networks. The IMS 40 provides access independent, IP-based multi-media services such as voice over IP (VoIP) to mobile subscribers. While the present invention is described in the context of communications between a mobile terminal 100 and an IMS 40, it is useful in other contexts where signaling messages need to be transmitted over a wireless network 10. Therefore, the description of the invention in this context should not be construed as limiting the invention.

The IMS 40 uses open interfaces and an access independent session control protocol (SCP), such as the Session Initiation Protocol (SIP), to support multi-media applications. SIP is an application layer control protocol for establishing, modifying and terminating communication sessions between one or more participants. These sessions may include, for example, Internet multimedia conferences, Internet telephony calls, multimedia distributions and network gaming. The SIP is described in the Internet Engineering Task force (IETF) document RFC 3261. While a preferred embodiment of the invention as described herein uses the SIP, those skilled in the art will appreciate that the present invention may be employed with other SCPs as well. Another well-known protocol comparable to the SIP is H. 323.

SIP is a signaling protocol that uses text-based messages to establish a conference or call between two or more participants. Users are identified by a unique address referred to herein as the SIP address. Users register with a registrar server using their assigned SIP addresses. The registrar server provides this address to a location server upon request. When a user initiates a call, a SIP request is sent to the called party. The request includes the calling party address and called party address in a message header. If a proxy server receives the SIP request, it forwards the SIP request to the called party. The called party may be another mobile terminal or may be an application server in the user's home network. The called party sends a response to the SIP request, which may also pass through a proxy server to the mobile terminal. The proxy server forwards the response to the calling party. The calling party acknowledges the response and a session is then established between the calling party and the called party. Media, such as audio and video, can then be transferred between the parties using Real Time Protocol (RTP) or Message Sessions Relay Protocol (MSRP) for media transport.

If a redirect server receives the SIP request, the redirect server contacts the location server to determine the path to the called party, and then sends that information to the calling party. The calling party acknowledges receipt of the information and then resends the SIP request to the server identified in the redirection information (which could be the called party or a proxy server). When the SIP request reaches the called party, the called party responds and the calling party acknowledges the response.

SIP enables applications residing in mobile devices operating within the wireless network 10 to establish RTP and MSRP sessions with other applications in remote devices. The remote applications may reside in a mobile terminal 100, in a computer connected to a fixed network, or in an application server in the IMS 40. Additionally, the applications may reside in different networks 10.

Figure 2:
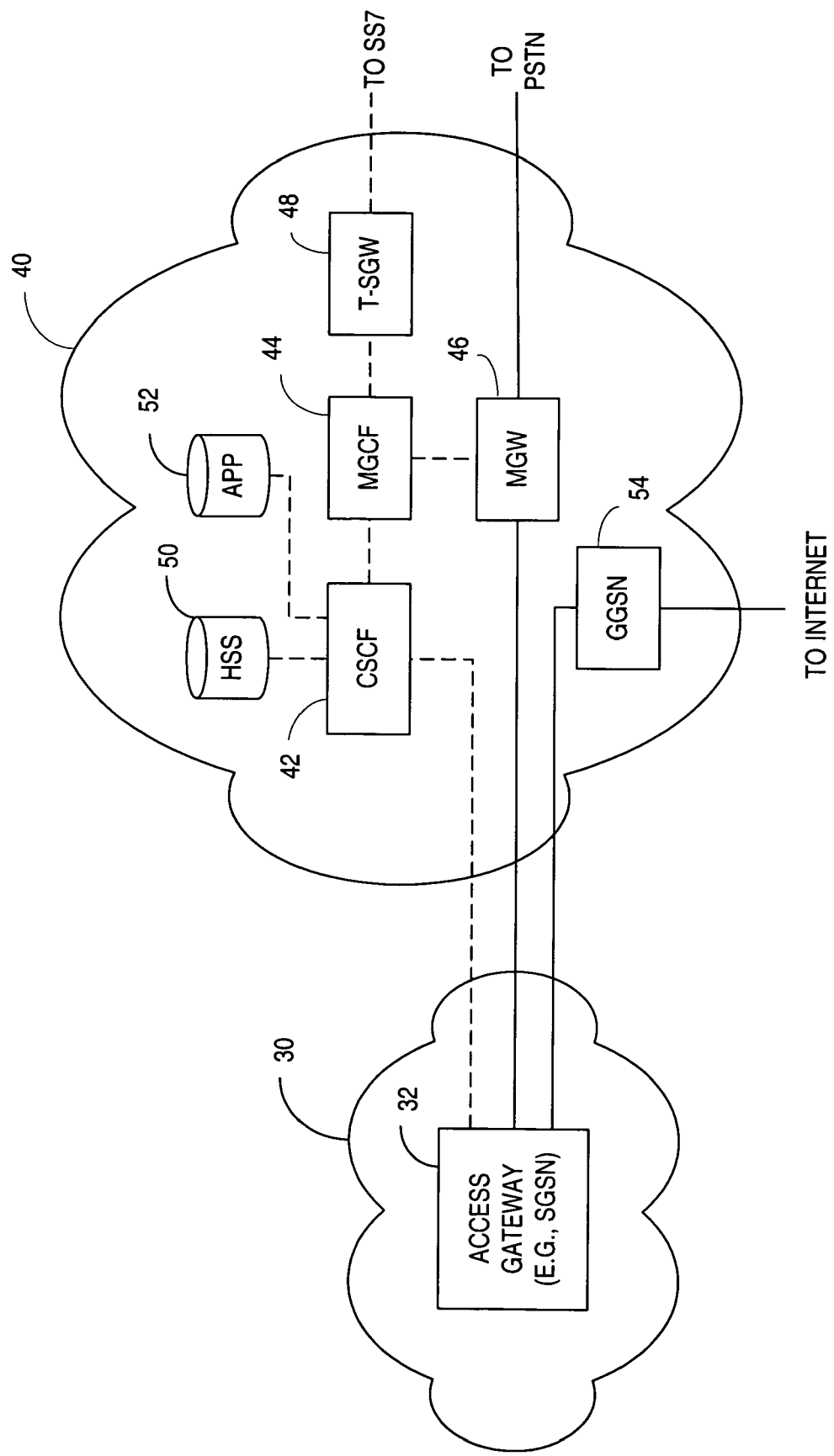
FIG. 2 is a functional block diagram illustrating the IP multimedia subsystem and its relationship to the core network in the wireless network of FIG. 1.

FIG. 2 illustrates the basic elements of the IMS 40 and its relationship to the CN 30. The IMS 40 includes one or more Call State Control Functions (CSCFs) 42, a Media Gateway Control Function (MGCF) 44, a Media Gateway (MGW) 46, a Transport Signaling Gateway (T-SGW) 48, GPRS Gateway Support Node (GGSN) 54, and a Home Subscriber Server (HSS) 50, which are interconnected by an IP network. The IMS 40 may further include an application server 52 providing multimedia services to mobile terminals 100. The CSCFs 42 function as SIP servers to process session control signaling used to establish, maintain and terminate a communication session. The protocol used for a majority of the signaling in the IMS 40 is SIP. Functions performed by the CSCFs 42 include call control, address translation, authentication, capability negotiation, and subscriber profile management. The HSS 50 interfaces with the CSCFs 42 to provide information about the subscriber's current location and subscription information. The application server 52 provides multimedia services or other services to mobile subscribers.

The GGSN 54, MGCF 44, MGW 46 and T-SGW 48 support interworking with external networks, such as the PSTN or ISDN. The MGW 46 interfaces the media plane of the IMS 40 with the PSTN, while the T-SGW 48 interfaces the signaling plane of the IMS 40 to the SS7 network or other signaling network. The MGCF 44 controls the resources of the MGW 46 and performs protocol conversion. The MGCF 44 converts SIP messages into a different format, such as ISDN User Part (ISUP) messages, for transmission and forwards the converted messages to the T-SGW 48. The T-SGW 48 includes a protocol converter to convert IP messages to SS7 and vice versa. Media destined for the PSTN passes through the MGW 46. The GGSN interfaces the media plane of the IMS 40 with external packet data networks, such as the Internet.

Figure 3:
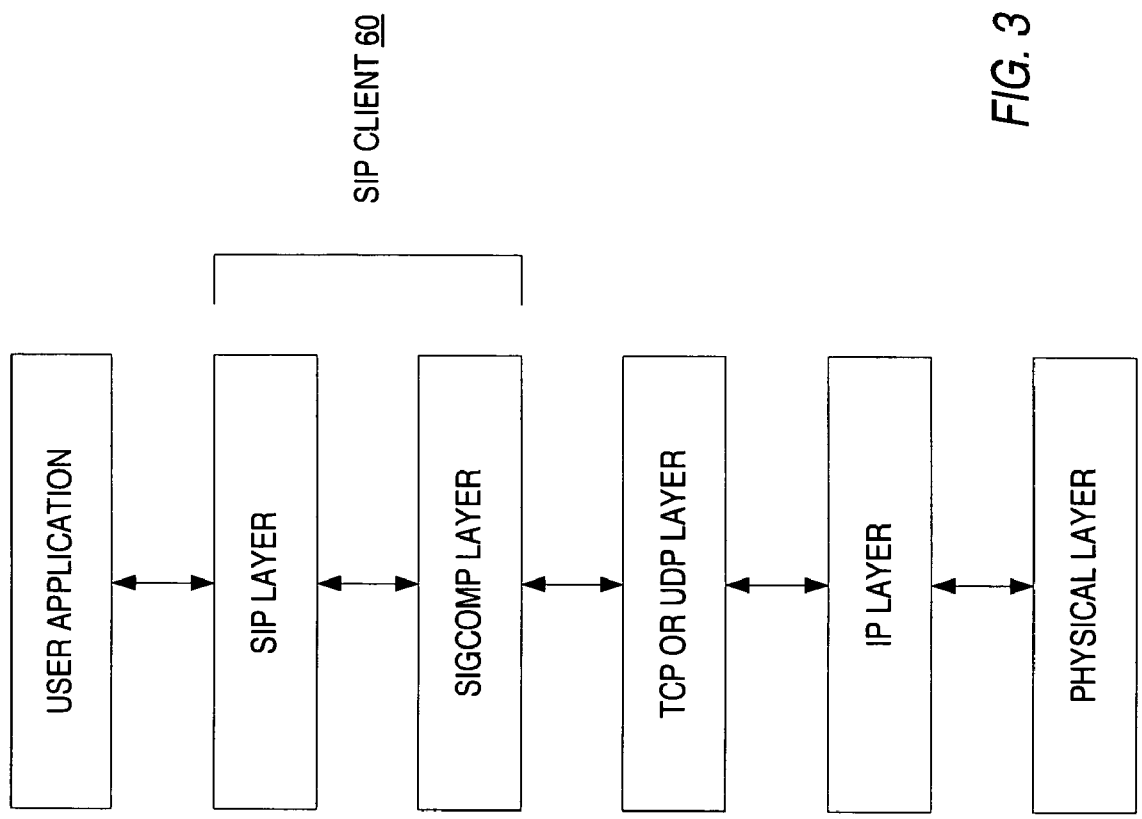
FIG. 3 illustrates a protocol stack for SIP-enabled devices.

FIG. 3 illustrates an exemplary protocol stack for signaling messages, such as SIP messages. When a user application desires to perform a task that requires the establishment, modification or termination of a communication session, the user application sends a request to a SIP client 60 (shown in FIG. 4), which may be integrated with the user application or may be a separate software component. The SIP client 60 handles the signaling needed to establish, modify, and terminate calls between two or more parties. Because SIP is a text based protocol, some messages are long and may require compression. SIP messages were originally designed for rich bandwidth connections and are typically in the order of 200 to 1800 octets. The message size of SIP messages causes some difficulties when SIP signaling must traverse a narrow bandwidth connection, such as a radio interface in wireless networks or a low-speed serial connection. The large message size of SIP messages consumes valuable bandwidth in wireless networks and substantially increases call set-up time. To ameliorate these problems, the SIP client 60 may implement a signal compression protocol, such as a SIGCOMP (IETF RFC 3320). SIGCOMP is a signal compression and decompression protocol for compressing SIP and other text-based signaling messages. SIGCOMP adds a signal compression layer between the application and the transport layers. SIGCOMP works with a wide range of transport protocols including TCP and UDP. From the application's perspective, the signal compression layer appears as a new transport. The SIGCOMP layer outputs the compressed messages to the transport layer, which may use TCP or UDP. TCP is a transport protocol that provides reliable delivery, while UDP provides unreliable delivery. Both TCP and UDP are carried over IP, which provides datagram and message routing services. The physical channel may comprise a wireless or wireline channel.

Figure 4:
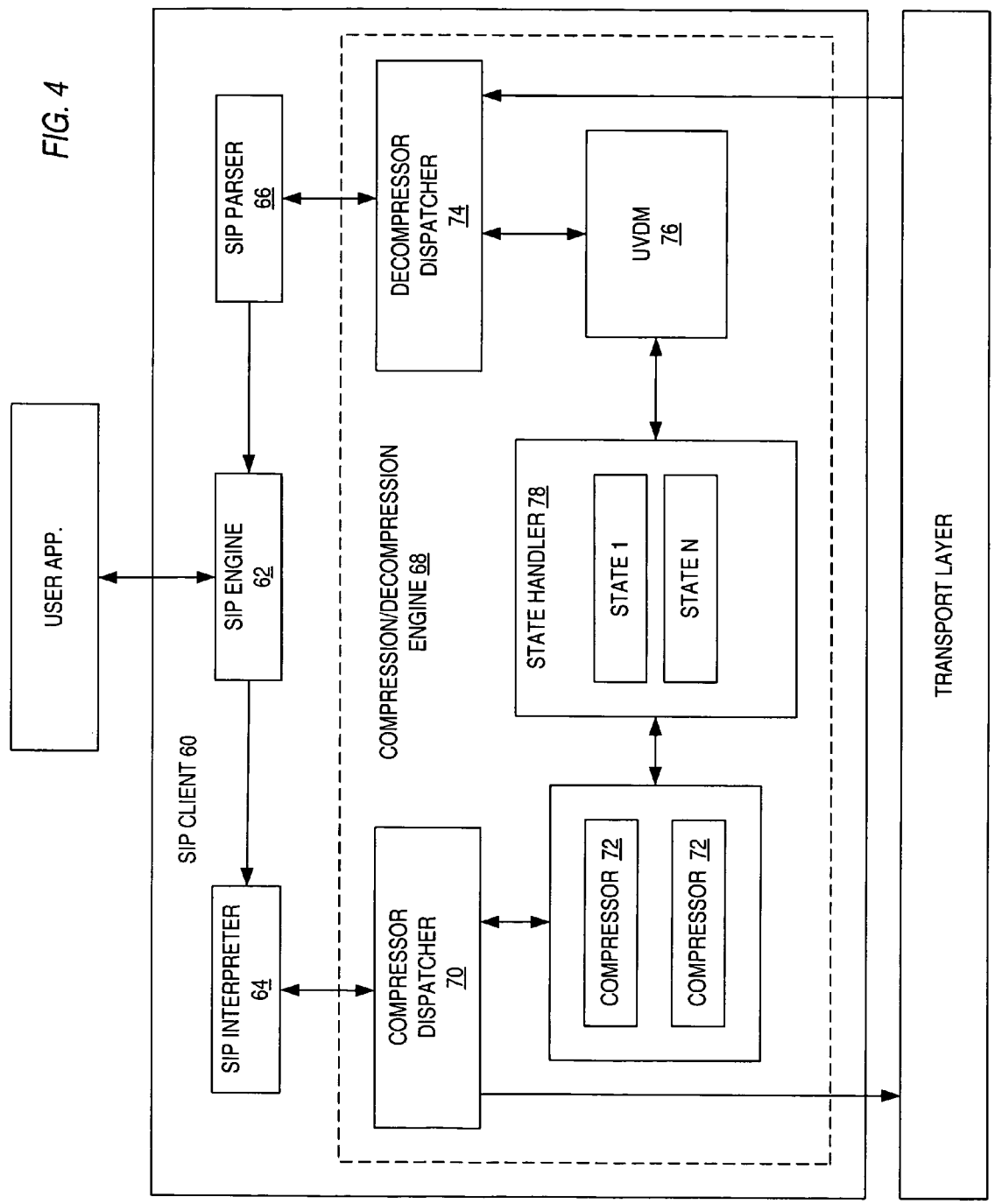
FIG. 4 illustrates an exemplary compression/decompression engine for compressing and decompressing signaling messages.

FIG. 4 illustrates the functional elements of a SIP client 60 that implements the SIGCOMP protocol. The SIP client 60 comprises a SIP engine 62, a SIP interpreter 64, a SIP parser 66 and a compression/decompression engine 68. The SIP engine 62 interfaces with the user application and contains the logic for generating and processing SIP messages. The SIP interpreter 64 compiles binary-encoded message data generated by the SIP engine to generate text-based SIP messages for transmission to a remote device. The SIP parser 66 processes received SIP messages to generate binary-encoded message data in a format that can be understood by the SIP engine 62. The compression/decompression engine 68 compresses and decompresses SIP messages to reduce the message size for transmission over the air interface in a wireless network.

The compression/decompression engine 68 comprises a compressor dispatcher 70, one or more compressors 72, a decompressor dispatcher 74, a Universal Decompression Virtual Machine (UDVM) 76, and a state handler 78. The SIP interpreter 64 normally supplies the compressor dispatcher 70 with a text-based SIP message to be compressed. The compressor dispatcher 70 passes the SIP message to a selected compressor 72. The compressor 72 compresses the message, and returns a compressed message to the compressor dispatcher 70. The compressor 72 may use a saved state or dictionary to perform compression. If not previously sent during registration or during in a previous message, the compressed message may include the decompression bytecode for decompressing the compressed message. The UVDM 76 at a proxy server or at the receiving endpoint executes the decompression bytecode to decompress the message. A separate instance of the UVDM 76 is invoked for each message. Because the originating endpoint sends executable bytecode for decompressing compressed SIP messages, the SIP client 60 is free to implement any compression algorithm and transfer the decompression code to the receiving endpoint. This ability to transfer decompression bytecode from the sending endpoint to the receiving endpoint is one of the key features of SIGCOMP and enables software developers and to use virtually any compression algorithm and still remain compatible with other devices.

The decompressor dispatcher 74 at the proxy server or at the receiving endpoint receives the compressed message and invokes the UVDM 76. The UVDM 76 decompresses the received message and passes the decompressed message to the decompressor dispatcher 74. The decompressor dispatcher 74 passes the decompressed message to the SIP parser 66 at the receiving endpoint.

The state handler 78 is an entity that stores and retrieves state information that is used by the compressor 72 and UVDM 76. A state is message data that is stored to assist in the compression and decompression of later signaling messages. State information is stored in a state memory. Each saved state is uniquely identified by a state identifier. The UVDM 76 may invoke the state handler 58 during decompression to retrieve a saved state from state memory or to create a new saved state. The compressor 72 at a sending endpoint may request creation of a new state by the UVDM 76 at a remote endpoint by sending a state creation to the remote endpoint. The compressor 72 must wait for an acknowledgement from the remote endpoint before it can use a saved state. When a saved state is used in the compression of a message, the state identifier is specified in the compressed message in place of the original text to enable retrieval of the correct state information at the remote endpoint.

Details regarding the structure and operation of the compression/decompression engine 68 may be found in IETF RFCs 3320, 3685 and 3321, and in the SigComp User Guide (draft-ietf-rohc-sigcomp-user-guide-01.text) dated Feb. 18, 2005. These documents are incorporated herein by reference. The SIGCOMP protocol provides a mechanism for transmitting binary data from the sending endpoint to a receiving endpoint. This transfer mechanism is used in the SIGCOMP protocol to transfer the decompression bytecode from the sending endpoint to the receiving endpoint. As described more fully below, the present invention uses this transfer mechanism for a different purpose. Before describing the operation of the present invention, it may be useful to briefly review how SIP/SDP signaling messages are conventionally transmitted.

Figure 5:
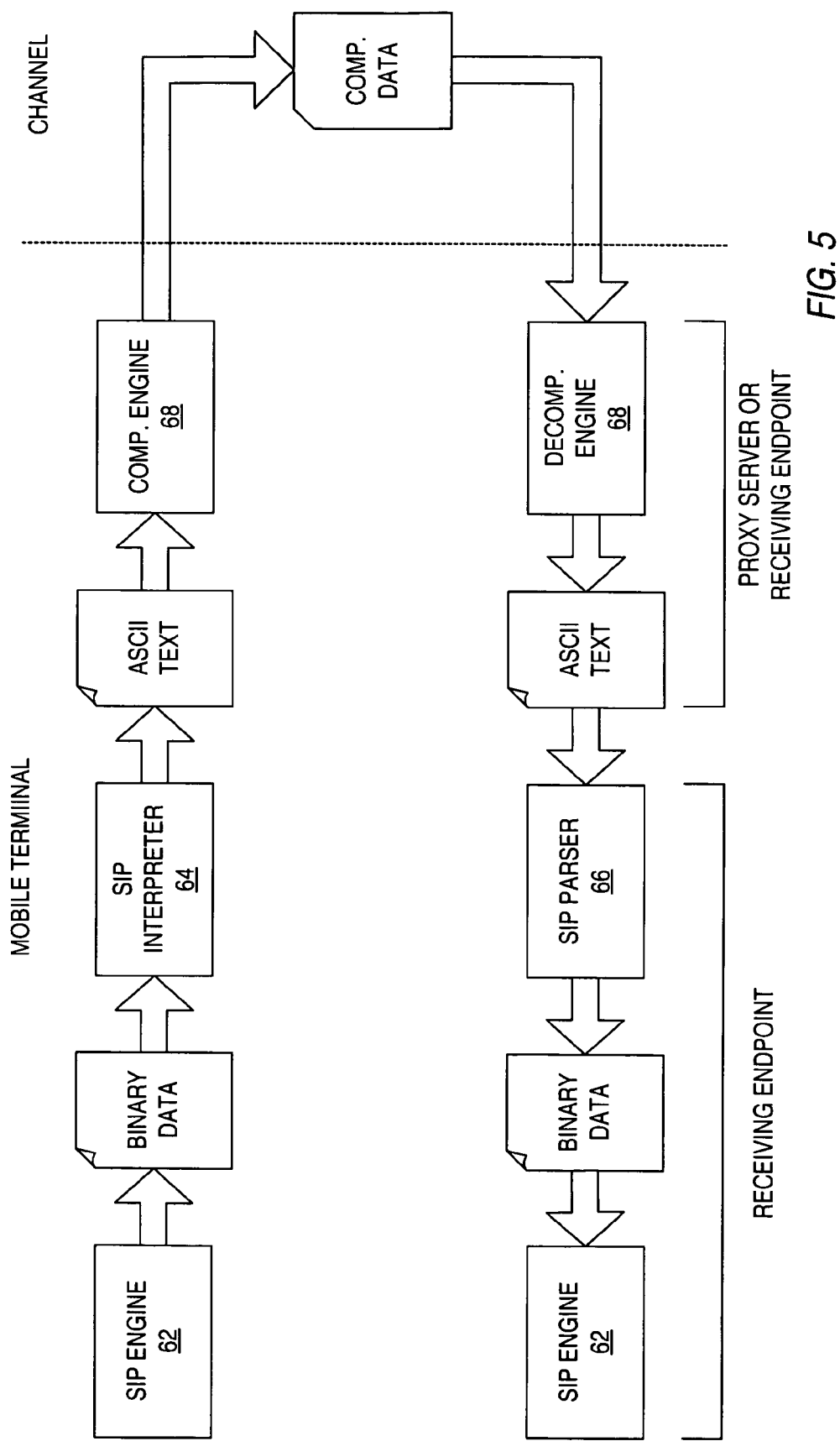
FIG. 5 illustrates a conventional method of compressing and sending SIP signaling.

FIG. 5 illustrates a conventional method of sending SIP messages between a mobile terminal and a proxy server or a receiving endpoint using a SIGCOMP compression/decompression engine 68. In the example, the mobile terminal 100 is the sending node and the proxy server or receiving endpoint is the receiving node. Those skilled in the art will recognize that the roles of the mobile terminal 100 and proxy server could be reversed. That is, the present invention could also be employed to send a signaling message from a proxy server or sending endpoint to the mobile terminal 100. It is not required that a proxy server be used to implement the present invention. It is contemplated, for example, that the present invention could be used to send SIP messages directly from one mobile terminal 100 acting as a sending endpoint to another mobile terminal 100 acting as a receiving endpoint.

As shown in FIG. 5, a SIP engine 62 at the mobile terminal 100 generates message data originally as binary data. There is no standard for the format of the binary message data produced by a SIP engine 62. Therefore, the binary message data at the mobile terminal 100 may not be understood by the SIP engine 62 at the receiving endpoint. The SIP interpreter 64 converts the binary message data to ASCII text to create text-based SIP messages. The SIP messages are passed to the compression/decompression engine 68. The compression/decompression engine 68 compresses SIP messages before transmission to reduce the message size. At the proxy server or receiving endpoint, the received messages are decompressed to recover the full text of the messages. In the case of a proxy server, the SIP message will be forwarded by the proxy server to a receiving endpoint after it is decompressed. At the receiving endpoint, a SIP parser 66 parses the SIP message, generates binary message data, and passes the binary message data to the SIP engine 62. The binary message data generated at the receiving endpoint may be different than the original binary message data generated at the transmitter. Thus, SIP enables two otherwise incompatible SIP engines 62 to communicate by providing a standard message format that can be understood by any SIP engine 62.

According to the present invention, the task of generating text-based SIP messages as specified by the standards is performed, not at the originating endpoint, but at the receiving endpoint. As noted earlier, the SIGCOMP protocol provides a mechanism to enable binary data to be transmitted to a remote endpoint. This mechanism is used in the conventional SIP signaling to transfer bytecode for decompressing SIP messages at the proxy server or receiving endpoint. The present invention exploits this capability to transfer binary message data to the receiving endpoint instead of standard SIP messages along with bytecode for compiling SIP messages from the binary message data. The bytecode can be executed at the proxy server or at a receiving endpoint the same as decompression bytecode to generate the SIP message at the proxy server or receiving endpoint.

Figure 6:
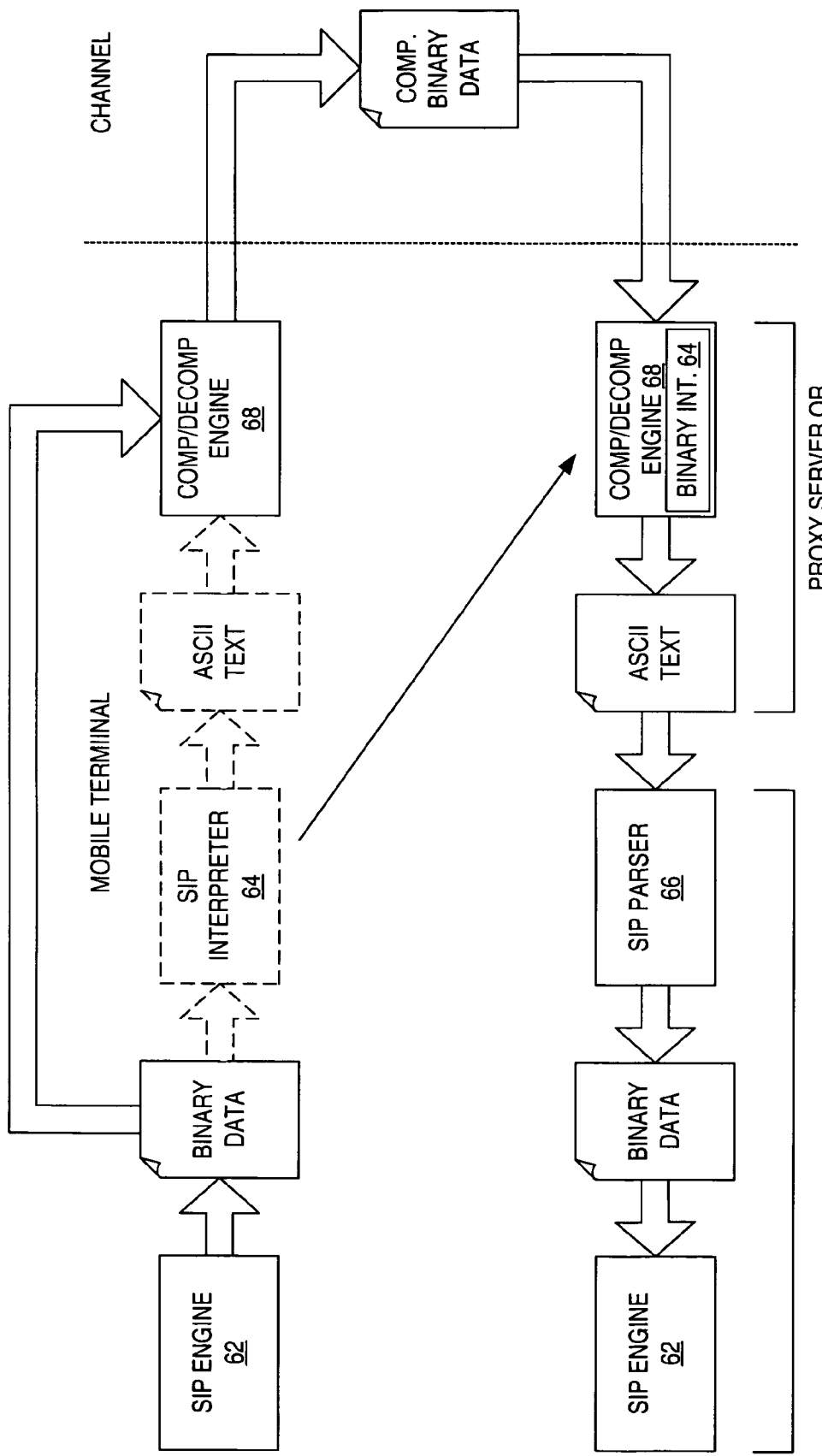
FIG. 6 illustrates an exemplary method of remote SIP generation according to a one embodiment of the present invention.

FIG. 6 illustrates an exemplary signaling method according to one embodiment of the present invention. As shown in FIG. 6, the SIP engine 62 generates binary message data that needs to be transmitted to the remote endpoint. Rather than compile the binary data to generate a text-based SIP message at the sending endpoint, the binary message data is transmitted to a proxy server or a receiving endpoint. As shown in FIG. 6, the binary message data is passed from the SIP engine 62 to the compression/decompression engine 68, bypassing the binary interpreter 64. The compression/decompression engine 68 compresses the binary message data and transmits compressed binary data to the proxy server or receiving endpoint. Additionally, the compression/decompression engine 68 transmits bytecode to the proxy server or receiving endpoint that functions as a binary interpreter 64 for compiling the binary message data to generate standard SIP text. The interpreter bytecode may be transmitted as part of the binary message if it has not been earlier sent. The compression/decompression engine 68 at the proxy server or receiving endpoint executes the interpreter bytecode the same as decompression bytecode to generate standard SIP messages. The interpreter bytecode enables the compression/decompression engine 68 to function as a binary interpreter 64. Thus, the binary interpreter 64 at the transmitting endpoint is effectively moved to the receiving endpoint or proxy. If the interpreter bytecode is executed in a proxy server, the proxy server forwards the generated SIP message to the receiving endpoint. At the receiving endpoint, a SIP parser 66 converts the SIP message into binary message data that can be understood by the SIP engine 62 at the receiving endpoint.

As shown in FIG. 6, only binary data is transmitted over the wireless link. Consequently, the amount of data that needs to be transmitted is significantly reduced as compared to the conventional method of transmitting ASCII-based SIP messages. Further, the processing delay and power associated with SIP message generation is reduced. As already indicated, reduction in the amount of data that needs to be transmitted can be realized by compressing the binary message data. The same techniques employed in compressing standard SIP text in the SIGCOMP protocol can be used to compress the binary message data. For example, message data (either binary or text) that recurs frequently can be saved as a state.

Also, a static dictionary based on frequently recurring states can be used to compress the binary data. The compression/decompression engine 68 uses the saved states or a dictionary to compress the binary message data the same as SIP text. In this case, binary message data passed to the compression/decompression engine 68 is replaced by a reference to a saved state, or by a reference to an item in a static dictionary in the same manner as is conventionally done with text-based signaling messages. One advantage of the present invention is that states are saved in binary form rather than as text so that memory requirements are significantly reduced.

While the present invention uses a SIGCOMP compression/decompression engine 68 to perform the function of the binary interpreter 64 at the proxy server or receiving endpoint, those skilled in the art will appreciate that other implementations are also possible. In other embodiments, it is also possible add a protocol layer between the SIP and TCP or UDP layer separate from the SIGCOMP layer to perform the expansion of binary message data into standard SIP text. One advantage of using SIGCOMP is that any node implementing SIGCOMP can receive compressed binary data and convert it to standard SIP text without any modification. Only the sending node needs to be modified (and then only slightly) to pass binary message data directly from the SIP engine 62 to the compression/decompression engine 68.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A text-based signaling method comprising:
   transmitting a signaling message from a sending node to a receiving node as a binary-encoded message;
   transmitting a binary interpreter comprising executable code from the sending node to the receiving node for converting the binary-encoded message to a text message at the receiving node.

2. The signaling method of claim 1 further comprising compressing the binary-encoded message.

3. The signaling method of claim 2 wherein compressing the binary-encoded message comprises replacing binary message data with a reference to a saved state.

4. The signaling method of claim 2 wherein compressing the binary-encoded message by replacing binary message data with a reference to a dictionary.

5. The signaling method of claim 1 wherein the binary interpreter is sent to the receiving node as part of the binary message.

6. The signaling method of claim 1 wherein the binary interpreter is sent separately from the binary message.

7. A communication device comprising:
   an application for communicating with remote devices;
   a SIP client interfacing with said application to perform signaling operations for establishing communication sessions with remote devices, said SIP client operative to transmit binary encoded signaling messages to said remote device and to transmit a binary interpreter comprising executable code for converting said binary-encoded signaling message into a text message to said remote device.

8. The communication device of claim 7 wherein the SIP client is further operative to compress the binary-encoded message before transmission.

9. The communication device of claim 8 wherein the SIP client compresses the binary-encoded message by replacing binary message data with a reference to a saved state.

10. The communication device of claim 8 wherein the SIP client compresses the binary-encoded message by replacing binary message data with a reference to an entry in a dictionary.

11. The communication device of claim 7 wherein the SIP client sends the binary-encoded data and the binary interpreter together as part of a single message.

12. The communication device of claim 7 wherein the SIP client sends the binary-encoded data and the binary interpreter separately in different messages.

* * * * *